(12) United States Patent
Harris et al.

(10) Patent No.: US 8,134,803 B2
(45) Date of Patent: Mar. 13, 2012

(54) SUSPENSION TONGUE DESIGN FOR VARYING THE STATIC PITCH AND ROLL TORQUE ON THE SLIDER OF A DISK DRIVE

(75) Inventors: John F. Harris, Boulder, CO (US); Todd Boucher, Longmont, CO (US)

(73) Assignee: Seagate Technology, LLC, Cupertino, CA (US)

( * ) Notice: Subject to any disclaimer, the term of this patent is extended or adjusted under 35 U.S.C. 154(b) by 1566 days.

(21) Appl. No.: 11/540,289

(22) Filed: Sep. 29, 2006

(65) Prior Publication Data

US 2007/0086115 A1    Apr. 19, 2007

Related U.S. Application Data

(60) Provisional application No. 60/726,908, filed on Oct. 14, 2005.

(51) Int. Cl.
    *G11B 5/48* (2006.01)
(52) U.S. Cl. .................. 360/245.3; 360/245; 360/245.4; 360/245.6
(58) Field of Classification Search .................. 360/245, 360/245.3–245.4, 245.6
    See application file for complete search history.

(56) References Cited

U.S. PATENT DOCUMENTS

| | | | | |
|---|---|---|---|---|
| 4,922,356 A | * | 5/1990 | Yamaguchi et al. | 360/245.4 |
| 5,243,482 A | * | 9/1993 | Yamaguchi et al. | 360/245.4 |
| 5,377,064 A | * | 12/1994 | Yaginuma et al. | 360/234.6 |
| 5,467,236 A | * | 11/1995 | Hatanai et al. | 360/234.6 |
| 5,636,088 A | * | 6/1997 | Yamamoto et al. | 360/245.1 |
| 6,078,473 A | * | 6/2000 | Crane et al. | 360/294.3 |
| 6,181,525 B1 | * | 1/2001 | Carlson | 360/245.7 |
| 6,381,104 B1 | * | 4/2002 | Soeno et al. | 360/294.4 |
| 6,515,832 B1 | * | 2/2003 | Girard | 360/245.3 |
| 6,633,458 B2 | * | 10/2003 | Wu et al. | 360/294.4 |
| 6,747,848 B2 | * | 6/2004 | Kasajima et al. | 360/245.3 |
| 6,801,398 B1 | * | 10/2004 | Ohwe et al. | 360/234.6 |
| 6,804,087 B2 | * | 10/2004 | Wobbe et al. | 360/245 |
| 6,831,815 B2 | | 12/2004 | Kasajima et al. | |
| 7,113,371 B1 | * | 9/2006 | Hanna et al. | 360/244.8 |
| 7,280,315 B1 | * | 10/2007 | Strom et al. | 360/234.6 |
| 7,688,552 B2 | * | 3/2010 | Yao et al. | 360/245.1 |
| 2004/0130824 A1 | * | 7/2004 | Ueno et al. | 360/244.8 |
| 2005/0162783 A1 | * | 7/2005 | Yao et al. | 360/294.4 |
| 2006/0082917 A1 | * | 4/2006 | Yao et al. | 360/75 |

* cited by examiner

*Primary Examiner* — Daniell L Negron
*Assistant Examiner* — Carlos E Garcia
(74) *Attorney, Agent, or Firm* — Mitchell K. McCarthy

(57) ABSTRACT

A head gimbal assembly includes a slider assembly and a flexure tongue that cantilevers in a first direction and supports the slider assembly. The slider assembly cantilevers away from the flexure tongue in a second direction different than the first direction. A load beam imparts a force on the flexure tongue and generates a first net torque on the slider assembly. The cantilevering of the slider assembly decreases a magnitude of the first net torque on the slider assembly. The force on the flexure tongue can also generate a second net torque on the slider assembly that is oriented about a second axis different than the first axis. The slider assembly can cantilever in the second direction to decrease the magnitude of the second net torque on the slider assembly. Portions of the flexure tongue and the slider assembly can be spaced apart from one another to form a gap that is directly between the flexure tongue and the slider assembly. The flexure tongue can includes a tongue aperture and/or one or more notches that increase the deflection of the flexure tongue to decrease the first net torque.

26 Claims, 6 Drawing Sheets

| Tongue Configuration | Gram induced pitch torque (mN-mm) | Pitch Stiffness (mN-mm/deg) | Pitch torque on flying slider (mN-mm) |
|---|---|---|---|
| Fig. 5A | -1.17 | 0.94 | +0.34 |
| Fig. 5B | -1.31 | 0.96 | +0.22 |
| Fig. 5C | -1.58 | 0.95 | -0.06 |

| Tongue Configuration | Low roll torque (Fig. 6A) | Low pitch and roll torque (Fig. 6B) |
|---|---|---|
| Gramload induced:<br>Pitch torque<br>Roll torque | mN-mm<br>-0.84<br>-0.22 | mN-mm<br>-1.24<br>-0.23 |
| Pitch Stiffness<br>Roll Stiffness | mN-mm/deg<br>0.831<br>0.76 | mN-mm/deg<br>0.80<br>0.75 |
| Pitch torque on flying slider<br>Roll Torque of flying slider | mN-mm<br>+0.49<br>0.00 | mN-mm<br>+0.04<br>0.00 |

SUSPENSION TONGUE DESIGN FOR VARYING THE STATIC PITCH AND ROLL TORQUE ON THE SLIDER OF A DISK DRIVE

RELATED APPLICATION

This Application claims the benefit on U.S. Provisional Application Ser. No. 60/726,908, filed on Oct. 14, 2005. The contents of U.S. Provisional Application Ser. No. 60/726,908 are incorporated herein by reference.

BACKGROUND

Disk drives are widely used in computers, consumer electronics and data processing systems for storing information in digital form. The disk drive typically includes one or more storage disks and one or more head gimbal assemblies. Each head gimbal assembly includes a suspension and a slider assembly having a slider that transfers information to and from the storage disk. In many disk drives, in order to decrease the likelihood of unwanted contact between the slider assembly and the storage disk, the slider assembly is positioned off the storage disk when the drive is not powered up or when data transmission is not occurring. For example, the slider assembly can be unloaded onto a ramp positioned inward from an inner diameter or beyond an outer diameter of the storage disk, also referred to as "ramp load technology". Once the disk drive receives a command necessitating the transmission of data, an actuator loads the slider assembly directly over a data storage area of the storage disk.

Because today's disk drives demand a greater amount of data storage, utilizing as much of the disk surface as possible for storing data has become of great importance. However, this desire to use more of the disk surface for data storage must be balanced with concerns of data loss and damage to the storage disk during repositioning of the slider assembly from the ramp to directly over the storage disk. During repositioning of the slider, dings, scratches and/or data loss can occur due to contact between the edges or corners of the slider and the storage disk. Other types of disk contact can result in frictional heating, causing erasure of data, commonly known as soft errors. Further, long term effects can result in premature degradation of the read/write head.

Through experimentation, it has been determined that providing a certain range of pitch static angles and/or roll static angles during loading and/or unloading of the slider assembly relative to the storage disk can be beneficial in reducing the incidence of contact between the slider and the storage disk. As used herein, the pitch static angle is the angle of the air bearing surface of the slider in a substantially longitudinal direction of the slider relative to the storage disk. The roll static angle is the angle of the air bearing surface of the slider in a direction substantially perpendicular to the longitudinal direction of the slider relative to the storage disk.

In conventional disk drives, a pitch torque or roll torque of the slider is often inherently generated as a function of the stiffness of the suspension and the pitch static and/or roll static angle. This type of slider torque can be undesirable during certain drive operations, such as during a seek mode or during data transfer while the slider is flying directly over the disk surface.

SUMMARY

The present invention is directed to a head gimbal assembly that includes a slider assembly and a flexure. The slider assembly includes a slider. In one embodiment, the flexure includes a flexure tongue that cantilevers in a first direction and supports the slider assembly so that the slider assembly cantilevers from the flexure tongue in a second direction that is different than the first direction. Further, the head gimbal assembly can include a load beam that imparts a force (such as a gramload) on the flexure tongue and generates a first net torque on the slider assembly. In this embodiment, the positioning of the slider assembly relative to the flexure tongue decreases a magnitude of the first net torque on the slider assembly.

In some embodiments, the slider assembly has a longitudinal axis, and the first net torque is oriented about a first axis that is perpendicular to the longitudinal axis of the slider assembly. Further, the first direction can be oriented substantially along the longitudinal axis of the slider assembly. In another embodiment, the slider assembly has a longitudinal axis, and the first net torque is oriented about a first axis that is parallel to the longitudinal axis of the slider assembly. In this embodiment, the first direction is substantially oriented perpendicularly to the longitudinal axis of the slider assembly.

In certain embodiments, the force on the flexure tongue generates a second net torque on the slider assembly that is oriented about a second axis that is different than the first axis. Further, in some embodiments, the slider assembly cantilevers from the flexure tongue in the second direction to decrease the magnitude of the second net torque on the slider assembly. The first net torque and the second net torque can be oriented about axes that are substantially perpendicular to one another.

In another embodiment, the slider assembly includes a slider retainer that retains the slider. The flexure tongue can be secured to the slider retainer and not secured to the slider. In certain embodiments, portions of the flexure tongue and the slider assembly are spaced apart from one another to form a gap that is directly between the flexure tongue and the slider. In some embodiments, the load beam includes a dimple that contacts the flexure tongue. The force can be imparted on the flexure tongue through the dimple and a portion of the gap is positioned directly between the dimple and the slider.

In some embodiments, the flexure tongue includes a tongue aperture that increases the deflection of the flexure tongue to decrease the first net torque. Additionally or in the alternative, the flexure tongue can include one or more notches that increase the deflection of the flexure tongue to decrease the first net torque. Further, the flexure tongue can be asymmetrical relative to the longitudinal axis of the flexure tongue.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6C is a chart correlating gramload induced pitch and roll torque, pitch and roll stiffness, and pitch and roll torque of a flying slider with the configurations of the head gimbal assemblies illustrated in FIGS. 6A-6B.

DESCRIPTION

Figure 1:
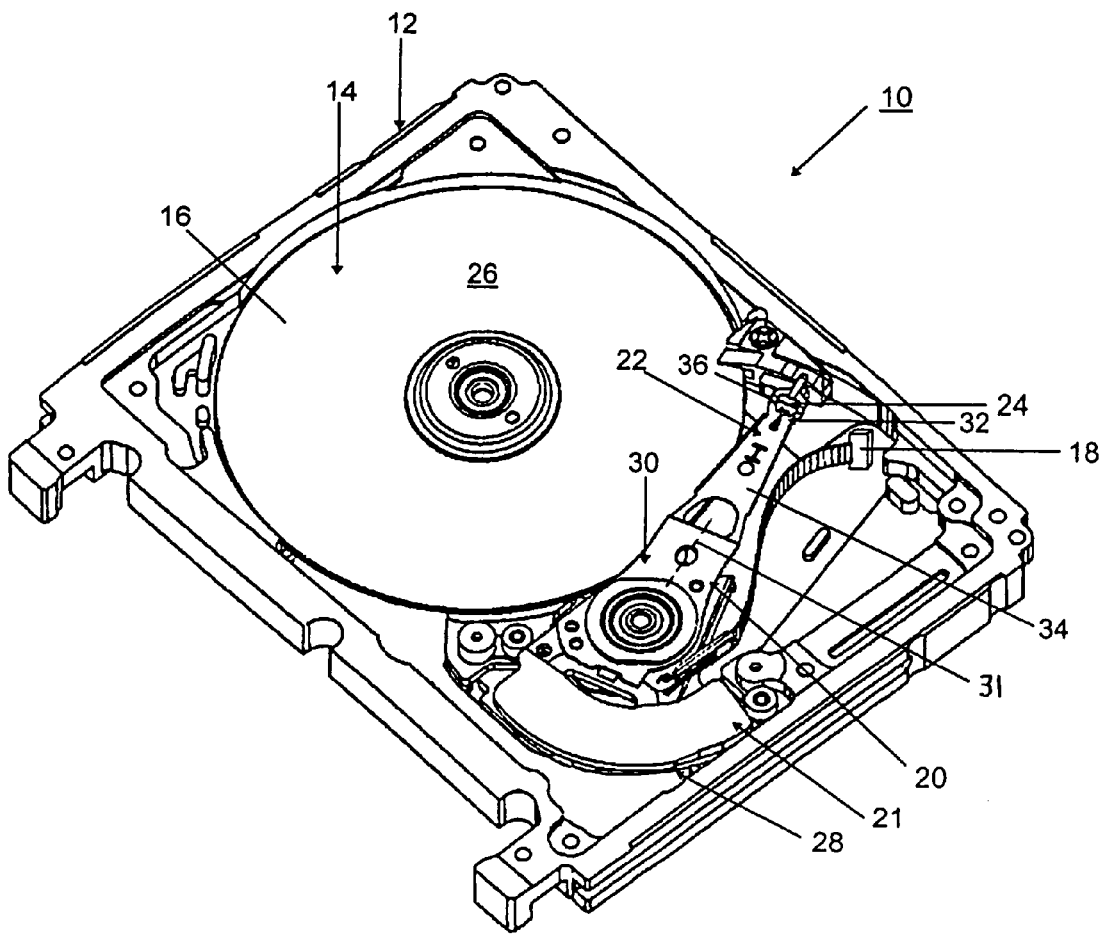
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including an actuator assembly 21 and one or more head gimbal assemblies 22, with each head gimbal assembly 22 including a slider assembly 24. Although the features described herein are provided in the context of the disk drive 10 as one non-exclusive example, it is recognized that these features can be useful in other suitable devices known to those skilled in the art.

Each storage disk 16 includes one or more disk surfaces 26 that each has a plurality of concentric data tracks (not shown) that store data, including a target track. Further, the storage disk 16 can also include non-data tracks, such as servo tracks. Once the slider assembly 24 stabilizes over the target track, data is read from the storage disk 16 during a read operation and transferred to the storage disk 16 during a write operation. The drive circuitry 18 sends electrical current to and/or receives electrical signals from the slider assembly 24 during read and/or write operations.

The head stack assembly 20 illustrated in FIG. 1 includes an actuator motor 28, one head gimbal assembly 22, and one actuator arm 30 having a longitudinal axis 31. The head gimbal assembly 22 is secured to the actuator arm 30, and supports the slider assembly 24 near one of the disk surfaces 26 of the storage disk 16 during operation of the disk drive 10. The actuator motor 28 moves the actuator arm 30 and the head gimbal assembly 22 relative to the storage disk 16. The head stack assembly 20 can alternatively include a plurality of actuator arms 30 that each supports up to two head gimbal assemblies 22.

Each head gimbal assembly 22 includes the slider assembly 24 and a suspension 32 that supports the slider assembly 24. The suspension 32 includes a load beam 34 and a flexure 36. The load beam 34 couples the flexure 36 and the slider assembly 24 to the actuator arm 30. Each load beam 34 can be flexible in a direction perpendicular to the storage disk 16 and can act as a spring for supporting the slider assembly 24. Typically, the load beam 34 is formed from a metallic material such as stainless steel or other suitable materials. In an alternative embodiment, the load beam 34 and the flexure 36 can be formed as an integral, unitary structure that can utilize homogeneous or non-homogeneous materials.

Each flexure 36 couples the slider assembly 24 to the load beam 34. The flexure 36 is formed from a metallic material such as stainless steel or other suitable materials.

The slider assembly 24 transfers information between the drive circuitry 18 and the storage disk 16. The design of the slider assembly 24 can vary depending upon the requirements of the head gimbal assembly 22 and/or the disk drive 10. The composition of the slider assembly 24 can vary. In one embodiment, portions of the slider assembly 24 can be formed from materials such as alumina titanium carbide ceramic, for example, or the slider assembly can include a combination of suitable materials.

Figure 2:
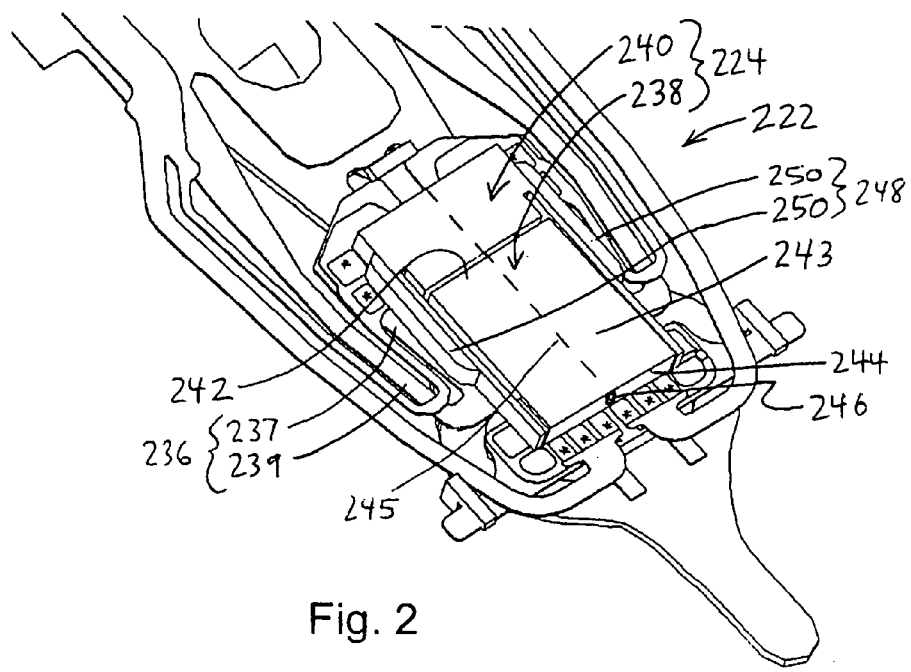
FIG. 2 is a bottom perspective view of an embodiment of a portion of a head gimbal assembly having features of the present invention.

FIG. 2 is a bottom perspective view of one embodiment of a portion of the head gimbal assembly 222 including a flexure 236 and a slider assembly 224. In this embodiment, the flexure 236 includes a flexure tongue 237 and a pair of flexure arms 239 (only one flexure arm 239 is identified) that are secured to or integrally formed with the flexure tongue 237.

Further, in this embodiment, the slider assembly 224 includes a slider 238 and a slider retainer 240 that retains and is secured to the slider 238. The slider 238 includes a leading edge 242, an air bearing surface 243 and a trailing edge 244. The slider assembly 224 and the slider 238 also share a longitudinal axis 245 that is extends in a direction substantially directly between the leading edge 242 and the trailing edge 244, as illustrated in FIG. 2. Further, the slider 238 includes a data transducer 246 that is positioned at or near the trailing edge 244. The data transducer 246 transfers data and/or other information between the storage disk 16 (illustrated in FIG. 1) and the drive circuitry 18 (illustrated in FIG. 1).

The slider retainer 240 can include a frame (also known as a "CAT frame" or a "U frame") that is secured to the flexure tongue 237. Stated another way, in this embodiment, the slider retainer 240 couples the slider 238 to the flexure 236 without direct contact between the slider 238 and the flexure 236 as described in greater detail below. In the embodiment illustrated in FIG. 2, the slider retainer 240 also includes a microactuator assembly 248 that positions the slider 238 relative to the storage disk 16. The microactuator assembly 248 includes one or more positioners 250. The type of positioners 250 can vary to suit the design requirements of the disk drive 10. For example, in one embodiment, the positioner(s) 250 can be piezoelectric element(s) that precisely adjust the position of the data transducer 246 relative to one of the tracks on the storage disk 16. In an alternative embodiment, the slider retainer 240 need not include a microactuator assembly 248.

Figure 3:
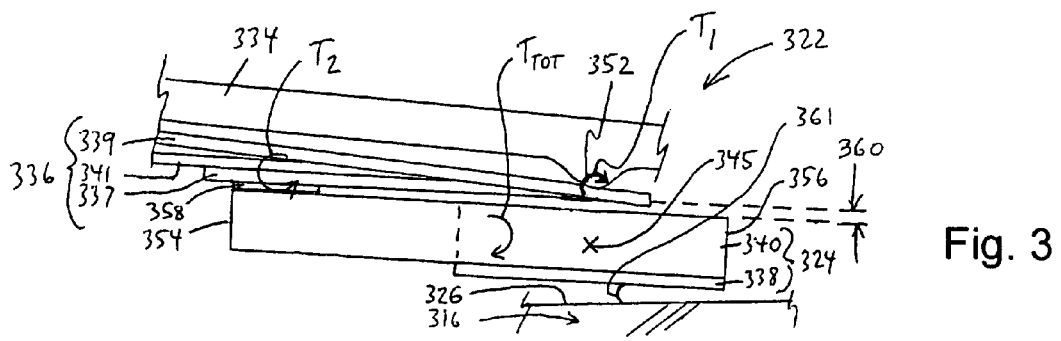
FIG. 3 is a simplified cross-sectional view of one embodiment of a portion of the head gimbal assembly.

FIG. 3 is a cross-sectional view of a portion of one embodiment of the head gimbal assembly 322. In this embodiment, the head gimbal assembly includes a load beam 334, a flexure 336, and a slider assembly 324. The load beam 334 includes a dimple 352 through which the load beam 334 imparts a force (sometimes referred to herein as a "gramload") against a flexure tongue 337 of the flexure 336 in a direction generally toward the storage disk 316. The gramload is translated by the flexure 336 to the slider assembly 324 and is sufficiently opposed by the air bearing generated by the rotating storage disk 316 to allow the slider to fly a very small distance above the disk surface 326 of the storage disk 316.

In one embodiment, the gramload from the load beam 334 is applied via the dimple 352 to the flexure 336 approximately in line with a center of gravity 345 of the slider 338. In other words, the center of gravity 345 of the slider 338 is approximately directly between the dimple 352 and the storage disk 16. Alternatively, the relative positioning of the dimple 352 and the center of gravity 345 of the slider 338 can vary so that the center of gravity 345 of the slider 338 is not positioned directly between the dimple 352 and the storage disk 316.

In certain embodiments, the flexure 336 includes the flexure tongue 337, one or more flexure arms 339, and one or more conductors 341. The flexure tongue supports the slider assembly 324. The flexure arms 339 are the primary structural members attaching the flexure tongue 337 to the load beam 334. The design of the flexure arms 339 at least partially dictates pitch stiffness and/or roll stiffness, as well as lateral stiffness (in a side-to-side direction) and/or vertical stiffness (in a direction toward and away from the storage disk 316) of the flexure 336. The conductors 341 conduct electrical signals between the drive circuitry 18 (illustrated in FIG. 1) and the slider assembly 324.

As illustrated in FIG. 3, the slider assembly 324 includes the slider 338 and the slider retainer 340 that retains or holds the slider 338. Further, the slider assembly 324 has a proximal edge 354 and a distal edge 356. The proximal edge 354 is nearest the actuator arm 30 (illustrated in FIG. 1), and the distal edge 356 is furthest away from the actuator arm 30.

In this embodiment, the slider retainer 340 is adhered or otherwise secured in a suitable manner to the flexure tongue 337. For example, a portion of the slider retainer 340 near the proximal edge 354 can be adhered to a portion of the flexure tongue 337 with an adhesive material 358, such as an epoxy, or by any other suitable material. The remainder of the flexure tongue 337 can cantilever out over the slider 338 without contacting the slider 338, as illustrated in FIG. 3. Stated another way, a portion of the slider retainer 340 is adhered to the flexure tongue 337 so that a portion of the flexure tongue 337 and a portion of the slider assembly 324 each cantilever away from this point of adhesion. With this configuration, a fluid gap 360, e.g., an air gap, exists between the cantilevering portion of the flexure tongue 337 and the cantilevering portion of the slider assembly 324. In this embodiment, no portion of the slider 338 is directly secured to the flexure 336. Thus, with this design, the gramload imparts an indirect force on the slider 338 because of the gap 360 that exists directly between the flexure tongue 337 and the slider 338.

In non-exclusive alternative embodiments, no more than approximately 5%, 10%, 25%, 33%, 50%, 75% or 90% of the length of the slider retainer 340, measured from the proximal edge 354 to the distal edge 356, is secured to the flexure tongue 337.

In a conventional head gimbal assembly, the gramload applied to the flexure 336 generates a first torque component $T_1$ on the flexure arms 339 due to initial pitch and/or roll static attitudes. In one embodiment, the first torque component is specifically a first pitch torque component of a net pitch torque on the slider assembly 324. As used herein, the pitch torque components and the net pitch torque refer to one or more rotational forces about an axis that is substantially perpendicular to the longitudinal axis 245 (illustrated in FIG. 2) of the slider 338. Alternatively, the first torque component $T_1$ can be a first roll torque component of a roll torque on the slider assembly 324 (described in greater detail below). As used herein, roll torque components and net roll torque refer to one or more rotational forces about an axis that is substantially parallel to the longitudinal axis 245 of the slider 338.

The first pitch torque component $T_1$ is approximately equal to a pitch static angle 361 of the slider 338 (measured in degrees relative to a reference such as the disk surface 326 of the storage disk 316) multiplied by the stiffness of the flexure arms 339 (also referred to herein as the "pitch stiffness", measured in mN-mm/deg).

With the structural designs described herein, the applied gramload to the flexure 336 causes a deflection of the flexure tongue 337 in a direction toward the storage disk 316. The deflection of the flexure tongue 337 toward the storage disk 316 causes a second torque component $T_2$ on the flexure arms 339 that at least partially, if not fully, offsets, cancels or opposes the first torque component $T_1$ on the flexure arms 339. In this embodiment, the second torque component $T_2$ is a second pitch torque component. Alternatively, the second torque component $T_2$ can be a second roll torque component (described in greater detail below). The sum of the first pitch torque component $T_1$ and second pitch torque component $T_2$ is referred to herein as the "net pitch torque" (denoted as $T_{TOT}$) on the slider assembly 324. Thus, the deflection of the flexure tongue 337 results in the second pitch torque component $T_2$, which at least partially offsets the first pitch torque component $T_1$ to reduce the magnitude of the net pitch torque TTOT on the slider assembly 324 during flying over the disk surface 326 of the storage disk 316. Therefore, in certain embodiments, the magnitude of the net pitch torque $T_{TOT}$ is less than the magnitude of the first pitch torque component $T_1$.

Figure 4:
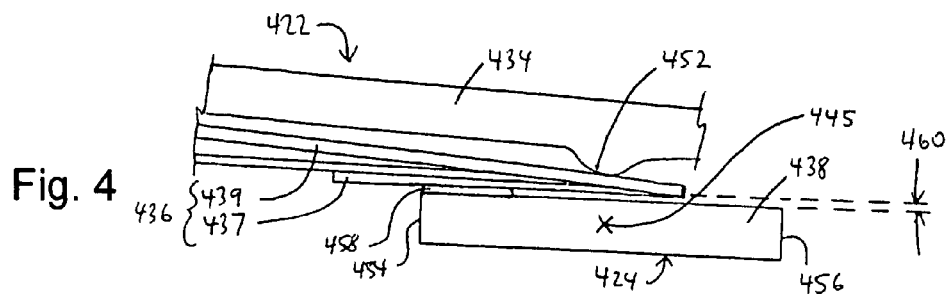
FIG. 4 is a simplified cross-sectional view of another embodiment of a portion of the head gimbal assembly.

FIG. 4 is a cross-sectional view of a portion of one embodiment of the head gimbal assembly 422. In this embodiment, the head gimbal assembly includes a load beam 434, a flexure 436, and a slider assembly 424. The flexure 436 includes a flexure tongue 437 and one or more flexure arms 439. However, in this embodiment, the slider assembly 424 includes a slider 438, and does not include a slider retainer 340 (illustrated in FIG. 3). The slider 438 is adhered directly to the flexure tongue 437 with an adhesive material or by another suitable means. In one such embodiment, the gramload from the load beam 434 is applied via the dimple 452 to the flexure.436 approximately in line with a center of gravity 445 of the slider 438. In other words, the center of gravity 445 of the slider 438 is approximately directly between the dimple 452 and the storage disk 16 (illustrated in FIG. 1). Alternatively, the relative positioning of the dimple 452 and the center of gravity 445 of the slider 438 can vary so that the center of gravity 445 of the slider 438 is not positioned directly between the dimple 452 and the storage disk 16.

In the embodiment illustrated in FIG. 4, the slider 438 is adhered or otherwise secured in a suitable manner to the flexure tongue 437. For example, a portion of the slider 438 near the proximal edge 454 can be adhered to a portion of the flexure tongue 437 with an adhesive material 458, such as an epoxy, or by any other suitable material. The remainder of the flexure tongue 437 can cantilever out over the slider 438 without contacting the slider 438, as illustrated in FIG. 4. Stated another way, a portion of the slider 438 is adhered to the flexure tongue 437 so that a portion of the flexure tongue 437 and a portion of the slider assembly 424 each cantilever away from this point of adhesion. With this configuration, a fluid gap 460, e.g., air gap, exists between the cantilevering portion of the flexure tongue 437 and the cantilevering portion of the slider assembly 424. Thus, with this design, the load beam 434 imparts a gramload indirectly on the slider 438 because of the gap 460 that exists directly between the dimple 452 and the slider 338, and more specifically, the center of gravity 445 of the slider 338.

In non-exclusive alternative embodiments, no more than approximately 5%, 10%, 25%, 33%, 50%, 75% or 90% of the length of the slider 438, measured from the proximal edge 454 to the distal edge 456, is secured to the flexure tongue 437. With these designs, the applied gramload to the flexure 436 causes a deflection of the flexure tongue 437 in a direction toward the storage disk 16. This deflection results in a second pitch torque component that at least partially offsets the first pitch torque component to reduce the magnitude of the net pitch torque on the slider assembly 424 during flying, as provided herein.

Figure 5A:
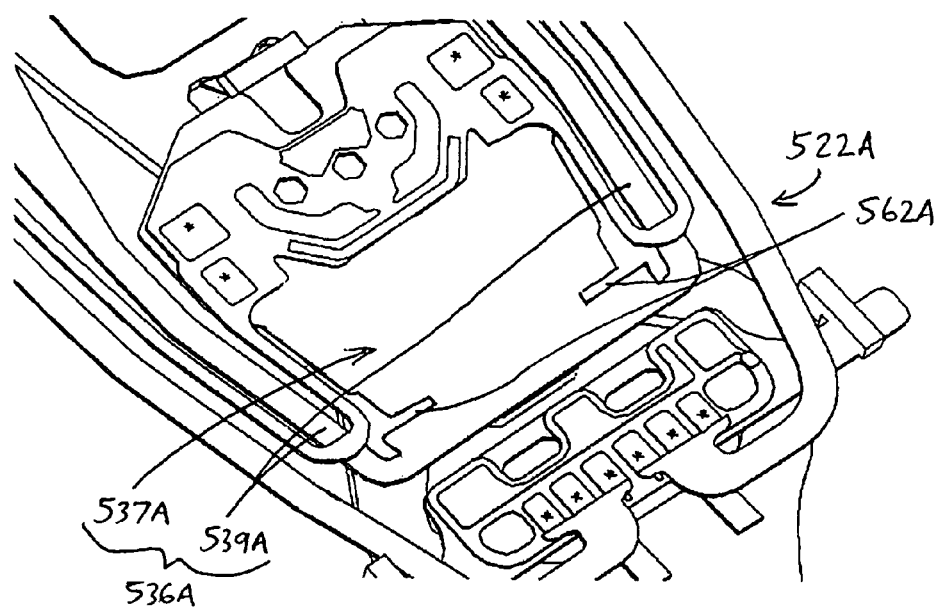
FIG. 5A is a bottom perspective view of a portion of the head gimbal assembly including a first embodiment of a flexure tongue.

FIG. 5A is a bottom perspective view of a portion of the head gimbal assembly 522A, including a flexure 536A having a flexure tongue 537A and a pair of flexure arms 539A. The slider assembly 224 (illustrated in FIG. 2) and various other components have been omitted from FIG. 5A for clarity. In the embodiment illustrated in FIG. 5A, the extent of the deflection of the flexure tongue 537A induced by the gramload as described above can be tuned to suit the design requirements of the head gimbal assembly 522A and the disk drive 10.

For example, in this embodiment, the flexure tongue 537A can include one or more notches 562A that decrease the stiffness of the flexure tongue 537A. In effect, the notches 562A weaken the overall rigidity of the flexure tongue 537A. As a result, the deflection of the flexure tongue 537A toward the storage disk 16 (illustrated in FIG. 1) is increased. With this design, the second pitch torque component offsets the first pitch torque component to a greater extent, thereby reducing the net pitch torque on the flexure arms 539A.

In effect, the designs described herein provide a means of adjusting the net pitch torque imparted on the slider 224, which can be useful during certain drive operations, such as when the slider 224 is flying over the storage disk 16 during reading, writing, seeking, etc. For example, instead of decreasing the pitch static angle, by adjusting the geometry of the flexure tongue 537A the same pitch static angle can be utilized, which may be beneficial during load and/or unload operations, or at other times during operation of the disk drive 10. Thus, the pitch static angle can be optimized for load and/or unload operations, but the normally high pitch torque associated with such a pitch static angle would not be present during flying of the slider over the storage disk during the course of other operations.

Figure 5B:
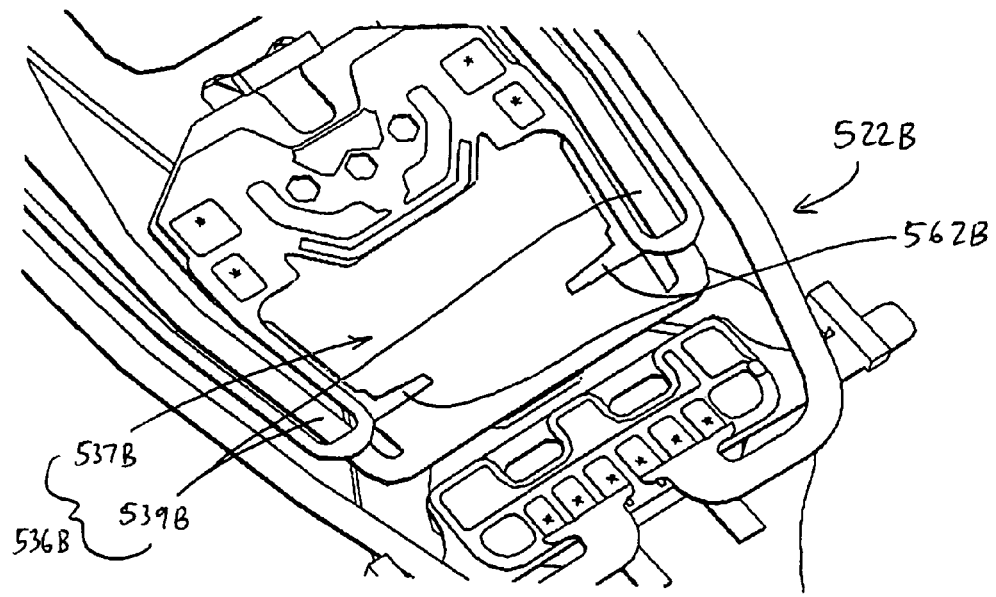
FIG. 5B is a bottom perspective view of a portion of the head gimbal assembly including a second embodiment of the flexure tongue.

FIG. 5B is a bottom perspective view of another embodiment of a portion of the suspension assembly 522B, including a flexure 536B having a flexure tongue 537B and a pair of flexure arms 539B. The slider assembly 224 (illustrated in FIG. 2) and various other components have been omitted from FIG. 5B for clarity. In the embodiment illustrated in FIG. 5B, the extent of the deflection of the flexure tongue 537B induced by the gramload as described above can be tuned to suit the design requirements of the head gimbal assembly 522B and the disk drive 10.

In this embodiment, somewhat similar to the embodiment illustrated in FIG. 5A, the flexure tongue 537B can include one or more notches 562B that decrease the stiffness of the flexure tongue 537B. However, in this embodiment, the notches are larger and are positioned more toward the direction of the actuator arm 30 (illustrated in FIG. 1). In effect, the notches 562B weaken the overall rigidity of the flexure tongue 537B. As a result, the deflection of the flexure tongue 537B toward the storage disk 16 (illustrated in FIG. 1) is even greater than the deflection of the flexure tongue 537A illustrated in FIG. 5A. With this design, the second pitch torque component offsets the first pitch torque component to an even greater extent, thereby reducing the net pitch torque on the flexure arms 539B.

Figures 5C, 5D:
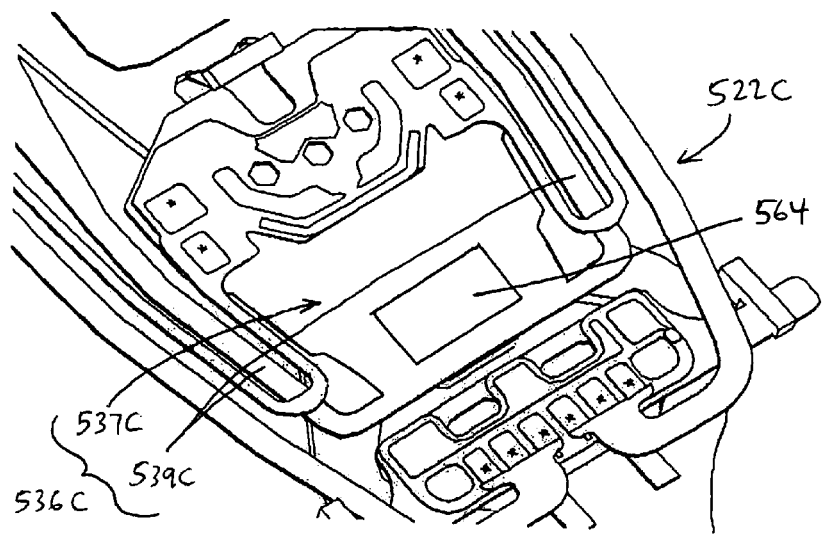
FIG. 5C is a bottom perspective view of a portion of the head gimbal assembly including a third embodiment of the flexure tongue.
FIG. 5D is a chart correlating force (such as a gramload induced pitch torque), pitch stiffness, and pitch torque of a flying slider with the configurations of the head gimbal assemblies illustrated in FIGS. 5A-5C.

FIG. 5C is a bottom perspective view of another embodiment of a portion of the suspension assembly 522C, including a flexure 536C having a flexure tongue 537C and a pair of flexure arms 539C. The slider assembly 224 (illustrated in FIG. 2) and various other components have been omitted from FIG. 5C for clarity. In the embodiment illustrated in FIG. 5C, the extent of the deflection of the flexure tongue 537C induced by the gramload as described above has been tuned to suit the design requirements of the head gimbal assembly 522C and the disk drive 10.

In this embodiment, the flexure tongue 537C can include one or more tongue apertures 564 (only one tongue aperture 564 is shown in FIG. 5C) that decrease the stiffness of the flexure tongue 537C. In effect, the tongue aperture(s) 564 weaken the overall rigidity of the flexure tongue 537C to permit greater deflection of the flexure tongue 537C. As a result, the deflection of the flexure tongue 537C toward the storage disk 16 (illustrated in FIG. 1) can be even greater than the deflection of the flexure tongue 537A illustrated in FIG. 5A and the flexure tongue 537B illustrated in FIG. 5B. With this design, the second pitch torque component offsets the first pitch torque component to an even greater extent, thereby reducing the net pitch torque on the flexure arms 539C.

Further, it is recognized that the flexure tongue can combine the features of the various embodiments described herein. For example, the flexure tongue can include one or more notches as well as one or more tongue apertures. Additionally, the positioning of the notches and/or the tongue apertures can be varied as required to achieve the desired degree of offset of the first pitch torque component, and thus, the net pitch torque on the slider. The examples provided herein are not intended to in any way limit the scope of the present invention, but are instead provided for ease of understanding the overall intent of the invention.

FIG. 5D is a chart showing the effect of the designs of the present invention illustrated in FIGS. 5A-5C relative to the reduction of net pitch torque. For example, as provided previously, pitch static angle multiplied by pitch stiffness is equal to the first pitch torque component. Thus, with respect to the embodiment illustrated in FIG. 5A, assuming a pitch static angle of 1.6 degrees and a 2.5 gramload, the first pitch torque component equals:

$$1.6 \text{ degrees} \times 0.94 \text{ mN-mm/deg.} \approx 1.50 \text{ mN-mm.}$$

In this embodiment, the calculated second pitch torque component caused by deflection of the flexure tongue=−1.17 mN-mm. Therefore, the net pitch torque on the slider is as follows:

$$1.50 \text{ mN-mm} + (-1.17 \text{ mN-mm}) = 0.34 \text{ mN-mm.}$$

With respect to the embodiment illustrated in FIG. 5B, under the same assumptions, the first pitch torque component equals:

$$1.6 \text{ degrees} \times 0.96 \text{ mN-mm/deg.} \approx 1.53 \text{ mN-mm.}$$

In this embodiment, the calculated second pitch torque component caused by deflection of the flexure tongue=−1.31 mN-mm. Therefore, the net pitch torque on the slider is as follows:

$$1.53 \text{ mN-mm} + (-1.31 \text{ mN-mm}) = 0.22 \text{ mN-mm.}$$

With respect to the embodiment illustrated in FIG. 5C, under the same assumptions, the first pitch torque component equals:

$$1.6 \text{ degrees} \times 0.95 \text{ mN-mm/deg.} \approx 1.52 \text{ mN-mm.}$$

In this embodiment, the calculated second pitch torque component caused by deflection of the flexure tongue=−1.58 mN-mm. Therefore, the net pitch torque on the slider is as follows:

$$1.52 \text{ mN-mm} + (-1.58 \text{ mN-mm}) = -0.06 \text{ mN-mm.}$$

It is recognized that the presence and/or positioning of the notches 562A-B and/or the tongue aperture(s) 564 allows the flexure 536 to be tuned in order to adjust the net pitch torque on the slider to reduce the net pitch torque approximately to zero or any other suitable amount. In non-exclusive alternative embodiments, the second pitch torque component can offset the first pitch torque component by at least approximately 1%, 5%, 10%, 25%, 50%, 75%, 90%, 95%, 100%, 105%, 110%, 125%, 150%, 175%, or 200% or more.

The present invention is not limited to reducing the net pitch torque on the slider. In addition to the embodiments illustrated and described previously, or in the alternative, the head gimbal assembly can reduce the net roll torque on the slider. As used herein, the roll torque is somewhat similar to the pitch torque. However, the roll torque is oriented approximately perpendicularly to the pitch torque. In other words, the roll torque is oriented substantially perpendicularly to a line that extends from the proximal edge to the distal edge of the slider assembly.

Figure 6A:
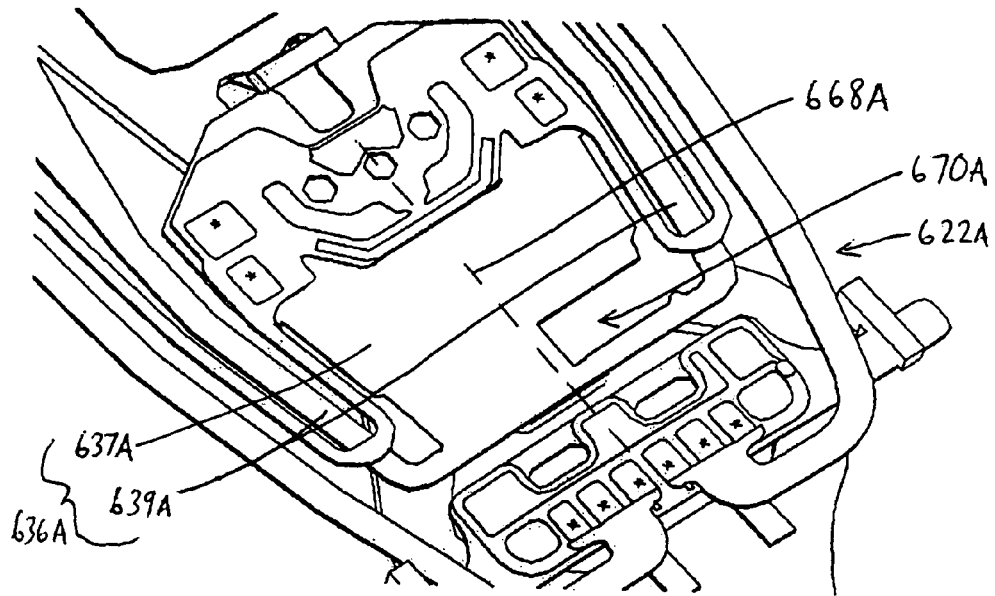
FIG. 6A is a bottom perspective view of a portion of the head gimbal assembly including a fourth embodiment of the flexure tongue.

FIG. 6A is a bottom perspective view of another embodiment of the head gimbal assembly 622A, including a flexure 636A having a flexure tongue 637A and a pair of flexure arms 639A. In this embodiment, the flexure tongue 637A is designed to reduce the net roll torque on the slider 238 (illustrated in FIG. 2). The slider assembly 224 (illustrated in FIG. 2) and various other components have been omitted from FIG. 6A for clarity. In this embodiment, the flexure tongue 637A is asymmetrical about a longitudinal axis 668A of the flexure tongue 637A. More specifically, in one embodiment, the flexure tongue 637A includes a notch 670A that is positioned asymmetrically relative to the longitudinal axis 668A. The notch 670A can effectively decrease the stiffness of the flexure tongue 637A. In effect, the notch 670A weakens the overall rigidity of the flexure tongue 637A. Alternatively, the flexure tongue 637A can include a plurality of notches 670A that are positioned in an asymmetrical manner relative to the longitudinal axis 668A.

With this design, the flexure tongue 637A can deflect in a direction that is approximately perpendicular to the longitudinal axis 668A to generate a second roll torque component (not shown) that at least partially opposes or offsets a first roll torque component (not shown) on the slider 238. Thus, in this embodiment, the net roll torque is less than the first roll torque component. It is recognized that the extent of the deflection of the flexure tongue 637A induced by the gramload as described above can be tuned to suit the design requirements of the head gimbal assembly 622A and the disk drive 10.

Figure 6B:
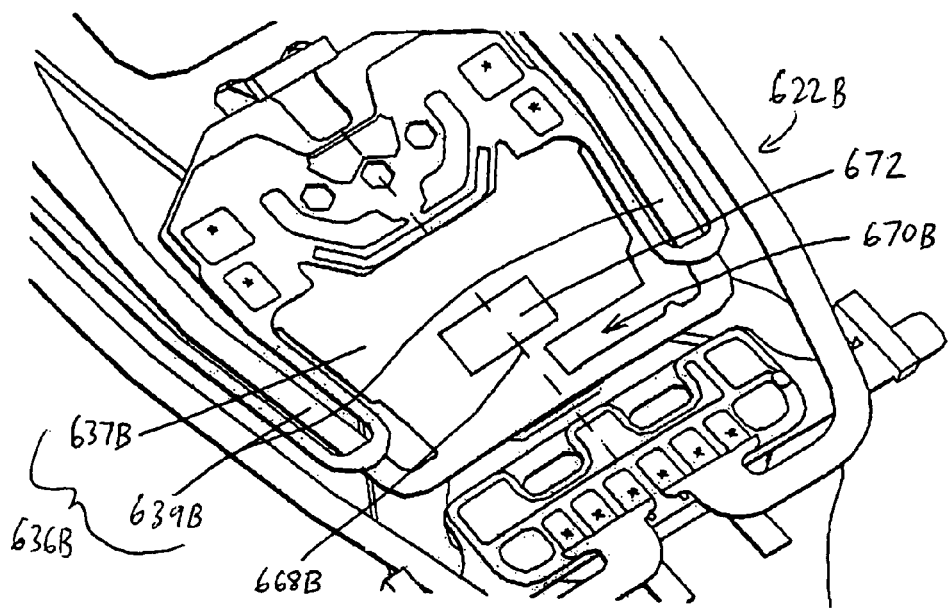
FIG. 6B is a bottom perspective view of a portion of the head gimbal assembly including a fifth embodiment of the flexure tongue.

FIG. 6B is a bottom perspective view of another embodiment of the head gimbal assembly 622B, including a flexure 636B having a flexure tongue 637B and a pair of flexure arms 639B. In this embodiment, the flexure tongue 637B is designed to reduce the net pitch torque and the net roll torque on the slider 238 (illustrated in FIG. 2). The slider assembly 224 (illustrated in FIG. 2) and various other components have been omitted from FIG. 6B for clarity. In the embodiment illustrated in FIG. 6B, the flexure tongue 637B is asymmetrical about a longitudinal axis 668B of the flexure tongue 637B. More specifically, in one embodiment, the flexure tongue 637B includes a notch 670B that is positioned asymmetrically relative to the longitudinal axis 668B. The notch 670B can effectively decrease the stiffness of the flexure tongue 637B as provided previously.

Additionally, the flexure tongue 637B can include one or more tongue apertures 672 that are somewhat similar to the tongue aperture 564 (illustrated in FIG. 5C) previously described. In this embodiment, the tongue aperture 672 is substantially symmetrical relative to the longitudinal axis 668B, and permits deflection of the flexure tongue 637B in a direction substantially along the longitudinal axis 668B of the flexure tongue 637B. As a result of combining the notch 670B and the tongue aperture 672, the net pitch torque and the net roll torque can be simultaneously reduced during flying of the slider 238 over the storage disk 16.

FIG. 6C is a chart showing the effect of the designs of the present invention illustrated in FIGS. 6A-6B relative to the reduction of net roll torque, and total pitch and roll torque, respectively. Somewhat similar to the relationship of pitch torque, roll static angle multiplied by roll stiffness is equal to the first roll torque component. Thus, with respect to the embodiment illustrated in FIG. 6A, assuming a roll static angle of 0.3 degrees and a 2.5 gramload, the first roll torque component equals:

$$0.3 \text{ degrees} \times 0.76 \text{ mN-mm/deg.} \approx 0.22 \text{ mN-mm.}$$

In this embodiment, the calculated second roll torque component caused by deflection of the flexure tongue=−0.22 mN-mm. Therefore, the net pitch torque on the slider is as follows:

$$0.22 \text{ mN-mm} + (-0.22 \text{ mN-mm}) = 0.00 \text{ mN-mm.}$$

Further, the design of the embodiment illustrated in FIG. 6A also has an impact on the net pitch torque. Under the assumptions of a pitch static angle of 1.6 degrees, the first pitch torque component equals:

$$1.6 \text{ degrees} \times 0.831 \text{ mN-mm/deg.} \approx 1.33 \text{ mN-mm.}$$

In this embodiment, the calculated second pitch torque component caused by deflection of the flexure tongue=−0.84 mN-mm. Therefore, the net pitch torque on the slider is as follows:

$$1.33 \text{ mN-mm} + (-0.84 \text{ mN-mm}) = 0.49 \text{ mN-mm.}$$

With respect to the embodiment illustrated in FIG. 6B, under the same assumptions, the first pitch torque component equals:

$$1.6 \text{ degrees} \times 0.80 \text{ mN-mm/deg.} \approx 1.28 \text{ mN-mm.}$$

In this embodiment, the calculated second pitch torque component caused by deflection of the flexure tongue=−1.24 mN-mm. Therefore, the net pitch torque on the slider is as follows:

$$1.28 \text{ mN-mm} + (-1.24 \text{ mN-mm}) = 0.04 \text{ mN-mm.}$$

Further, under the same assumptions relative to roll static angle as above, the first roll torque component equals:

$$0.3 \text{ degrees} \times 0.75 \text{ mN-mm/deg.} \approx 0.23 \text{ mN-mm.}$$

In this embodiment, the calculated second roll torque component caused by deflection of the flexure tongue=−0.23 mN-mm. Therefore, the net pitch torque on the slider is as follows:

$$0.23 \text{ mN-mm} + (-0.23 \text{ mN-mm}) = 0.00 \text{ mN-mm.}$$

It is recognized that the presence and/or positioning of the notches 670A-B and/or the tongue aperture(s) 672 allows the flexure 636A-B to be tuned in order to adjust the net pitch torque on the slider to reduce the net pitch torque approximately to zero or any other suitable amount. In non-exclusive alternative embodiments, the second pitch and/or roll torque component can offset the first pitch and/or roll torque component, respectively, by at least approximately 1%, 5%, 10%, 25%, 50%, 75%, 90%, 95%, 100%, 105%, 110%, 125%, 150%, 175%, or 200% or more.

In effect, the designs described herein provide a means of adjusting the net pitch torque and/or net roll torque imparted on the slider 224, which can be useful during certain drive operations, such as when the slider 224 is flying over the storage disk 16 during reading, writing, seeking, etc. For example, instead of decreasing the pitch and/or roll static angle, by adjusting the geometry of the flexure tongue, the same pitch and/or roll static angles can be utilized, which may be beneficial during load and/or unload operations, or at other times during operation of the disk drive 10. Thus, in this example, the pitch and/or roll static angles can be optimized for load and/or unload operations, but the normally high torques associated with such pitch and/or roll static angles would not be present during flying of the slider over the storage disk during the course of other operations.

While the particular head gimbal assemblies 22 and disk drives 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A head gimbal assembly comprising:
a load beam;
a slider; and
a flexure arm having a distal end that is detached from but resiliently biased in a pressing engagement against the load beam, the flexure arm including a flexure tongue cantilevered in a first direction to operably impart a first torque to the slider, the slider cantilevered from the flexure tongue in a different second direction to define a substantially constant-thickness gap defined by a planar separation between the flexure tongue and the slider, the substantially constant-thickness gap extending entirely from the connection between the slider and the flexure tongue to a distal end of one of the slider and the flexure tongue, a longitudinal extent of the constant-thickness gap sized to operably impart a second torque to the slider of a desired magnitude that is offsetting to the first torque.

2. The head gimbal assembly of claim 1 wherein the load beam imparts a force on the flexure tongue generating a net pitch torque on the slider assembly that is oriented about a first axis that is perpendicular to a longitudinal axis of the slider assembly.

3. The head gimbal assembly of claim 2 wherein the first direction is substantially parallel to the longitudinal axis.

4. The head gimbal assembly of claim 2 wherein a net roll torque is oriented about a second axis that is parallel to the longitudinal axis of the slider.

5. The head gimbal assembly of claim 1 wherein the slider includes a slider retainer that retains the slider, and wherein the flexure tongue is secured to the slider retainer.

6. The head gimbal assembly of claim 5 wherein the flexure tongue is not secured to the slider.

7. The head gimbal assembly of claim 2 wherein the load beam includes a dimple that contacts the flexure tongue, the force is imparted on the flexure tongue through the dimple, and a portion of the gap is positioned directly between the dimple and the slider.

8. The head gimbal assembly of claim 1 wherein the flexure tongue includes a tongue aperture that increases the deflection of the flexure tongue to decrease a net roll torque.

9. The head gimbal assembly of claim 1 wherein the flexure tongue includes a notch that increases the deflection of the flexure tongue to decrease a net roll torque.

10. The head gimbal assembly of claim 9 wherein the flexure tongue includes a tongue aperture that increases the deflection of the flexure tongue to decrease the net roll torque.

11. The head gimbal assembly of claim 1 wherein the flexure tongue has a longitudinal axis, and wherein the flexure tongue is asymmetrical relative to the longitudinal axis.

12. The head gimbal assembly of claim 1 wherein the first direction and the second direction are substantially opposite from one another.

13. A disk drive including a storage disk and the head gimbal assembly of claim 1 selectively supported near the storage disk.

14. A head gimbal assembly comprising:
a load beam;
a flexure arm affixed to the load beam at a proximal end of the flexure arm and flexibly detached from the load beam at a distal end of the flexure arm;
a flexure tongue extending from the distal end of the flexure arm;
a protuberant feature extending from at least one of the load beam and the flexure tongue that operably contactingly imparts a force from the load beam to the flexure tongue; and
a slider connected to the flexure tongue, nearer a leading end than a trailing end of the slider, to elsewhere define a constant size spatial gap between the flexure tongue and the slider forming a space extending at least to an extent defined by an orthogonal projection into the gap of the area of the protuberant feature engaging the opposing side of the flexure tongue, and the constant size spatial gap extending longitudinally from the connection between the slider and the flexure tongue to a distal end of one of the slider and the flexure tongue.

15. The head gimbal assembly of claim 14 wherein the slider assembly has a longitudinal axis, and a net pitch torque is in a direction about an axis that is perpendicular to the longitudinal axis of the slider.

16. The head gimbal assembly of claim 14 wherein the slider has a longitudinal axis, and a net roll torque is oriented about an axis that is parallel to the longitudinal axis of the slider assembly.

17. The head gimbal assembly of claim 16 wherein the first direction is substantially perpendicular to the longitudinal axis of the slider.

18. The head gimbal assembly of claim 14 wherein the slider includes a slider retainer that retains the slider, and wherein the flexure tongue is secured to the slider retainer.

19. The head gimbal assembly of claim 14 wherein the load beam includes a dimple that contacts the flexure tongue, the force is imparted on the flexure tongue through the dimple, and a portion of the gap is positioned directly between the dimple and the slider.

20. The head gimbal assembly of claim 14 wherein the flexure tongue has a longitudinal axis, and wherein the flexure tongue is asymmetrical relative to the longitudinal axis.

21. The head gimbal assembly of claim 14 wherein the flexure tongue includes a tongue aperture that increases the deflection of the flexure tongue to decrease a net roll torque.

22. The head gimbal assembly of claim 14 wherein the flexure tongue includes a notch that increases the deflection of the flexure tongue to decrease a net roll torque.

23. The head gimbal assembly of claim 22 wherein the flexure tongue includes a tongue aperture that increases the deflection of the flexure tongue to decrease the net roll torque.

24. A disk drive including a storage disk and the head gimbal assembly of claim 14 selectively supported near the storage disk.

25. The head gimbal assembly of claim 14 wherein the flexure tongue is cantilevered in a first direction and the slider is cantilevered in a different second direction.

26. The head gimbal assembly of claim 14 wherein a distal end of the slider is operably disposed longitudinally beyond the distal end of the flexure arm.

* * * * *